(12) United States Patent
Broer et al.

(10) Patent No.: US 6,359,670 B1
(45) Date of Patent: Mar. 19, 2002

(54) LIQUID-CRYSTAL DISPLAY DEVICE

(75) Inventors: Dirk J. Broer; Hugo J. Cornelissen, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/086,269

(22) Filed: May 28, 1998

(30) Foreign Application Priority Data

May 30, 1997 (EP) .............................................. 97201615

(51) Int. Cl.[7] .......................................... G02F 1/1335
(52) U.S. Cl. ......................................... 349/115; 349/96
(58) Field of Search ........................... 349/62, 115, 112, 349/96, 98, 185; 359/499

(56) References Cited

U.S. PATENT DOCUMENTS

| 3,806,227 A | * | 4/1974 | Greubel et al. ............. 349/112 |
| 5,486,884 A | * | 1/1996 | De Vaan ..................... 353/122 |
| 5,721,603 A | * | 2/1998 | De Vaan et al. ............ 349/194 |
| 5,731,886 A | * | 3/1998 | Taber et al. ................. 359/499 |
| 5,899,551 A | * | 5/1999 | Neijzen et al. ............. 349/115 |

FOREIGN PATENT DOCUMENTS

| EP | 0606939 A1 | | 7/1994 | ......... G02F/1/1335 |
| WO | WO9701788 | | 1/1997 | ......... G02F/1/1335 |
| WO | WO 97/01788 | * | 1/1997 | ................... 349/96 |

* cited by examiner

*Primary Examiner*—Toan Ton
(74) *Attorney, Agent, or Firm*—Ernestine C. Bartlett; Norman N. Spain

(57) ABSTRACT

A transflective liquid-crystal display device comprising a display cell (1) and a reflective polarizer (9), which preferably incorporates a cholesteric mirror (12) which practically completely reflects incident radiation (light) (14) of a specific polarization (left-hand or right-hand) originating from the display cell (reflective effect) and which passes a substantial degree of radiation (15) of the same polarization originating from (a light source (10) on) the other side (transmissive effect).

16 Claims, 4 Drawing Sheets

LIQUID-CRYSTAL DISPLAY DEVICE

BACKGROUND OF THE INVENTION

The invention relates to a liquid-crystal display device provided with a display cell comprising a layer of a liquid-crystal material sandwiched between a first polarizer having a first direction of polarization and a second polarizer having a second direction of polarization.

The invention further relates to a reflective polarizer having a polarization direction at a first surface.

The display device is used, for example, in instruments or (portable) communication equipment, such as mobile telephones.

A display device of the above-mentioned type is described in EP-A-0.606.939 (PHN 14.346). In said document, a transmissive display device is shown. The known display device is embodied so that a maximum amount of radiation (light) having the direction of polarization of the second polarizer is passed by a combination of a cholesteric filter and a ¼λ-plate. To achieve this, the direction of polarization of the second polarizer is parallel to the direction of polarization of the radiation passed by the combination of the cholesteric filter and the ¼λ-plate. The display device shown can only be used in the transmission mode.

OBJECTS AND SUMMARY OF THE INVENTION

It is an object of the invention to provide, inter alia, a display device which can be used in the transmission mode as well as in the reflection mode. The possibility of employing a display device in the reflection mode is desirable, particularly, in the case of display devices used in portable equipment, because it enables ambient light to be used, so that the supply source of the radiation source (generally an LED) has a longer service life. The invention further aims at providing such a transflective display device in which radiation from the radiation source (often constructed as a backlight or a sidelight) is optimally used.

To achieve this, a display device in accordance with the invention is characterized in that the display cell is provided with a reflective polarizer of which the direction of polarization on the side of the second polarizer makes an angle relative to the second direction of polarization and which has a polarization-changing effect on the side facing away from the second polarizer for light incident at an angle relative to the normal to the reflective polarizer.

In this application, the expression "reflective polarizer" is to be taken to mean a polarizer which, on at least one side of the reflective polarizer, passes linearly polarized radiation (light) in the so-called direction of polarization of the reflective polarizer, and which reflects linearly polarized radiation (light) in a direction at right angles thereto. In the known device, from the other side, circularly polarized incident radiation (light) is passed in the one direction, and circularly polarized incident radiation (light) is reflected in the other direction. It is alternatively possible, however, that the reflective polarizer passes or reflects linearly polarized radiation (light) on both sides.

The expression "polarization-changing effect" is to be understood to mean that the polarization state of radiation passing through the reflective polarizer changes (for example from circularly polarized to elliptically polarized or from elliptically polarized to linearly polarized, and even from linearly polarized back to circularly polarized in the opposite direction) and hence said radiation is passed at least partly, so that, after passing through the reflective polarizer, it is polarized, for example, in the direction of polarization of the second polarizer. This distinguishes this property from a so-called "depolarizing effect", which causes a polarization state to change in an uncontrolled manner or be lost completely, for example, as a result of irregularities at a surface or (local) variations, for example, in the refractive index (particularly at the surface). A good "polarization-changing effect" is already achieved, for example, if circularly polarized radiation (light) incident at an angle relative to the normal to the reflective polarizer, for example, of 30 degrees, is converted to elliptically polarized radiation (light) having an elipticity of at least 2, the term elipticity being defined as the ratio between the length of the long axis and the short axis of the ellipse described by the electric field vector of the radiation.

As, in the known device, front-side radiation passed by the display cell is polarized in the direction of polarization of the second polarizer, this radiation is passed by the cholesteric filter. As a result, such a device is unsuitable for use in the reflection mode. In the device in accordance with the invention, the reflective polarizer reflects more or less radiation as a function of the angle between the directions of polarization of the reflective polarizer and the second polarizer. If the directions of polarization cross each other at right angles, complete reflection takes place. As a result, the display device can suitably be used (in reflection) in ambient light conditions.

The part originating from the radiation source, which is passed by the reflective polarizer as a result of the polarization-changing effect, is (partly) passed, in succession, by the second polarizer and by the display cell. This polarization-changing effect, which is avoided as much as possible in the known device because it leads to a reduction in contrast (not to complete extinction upon driving between crossed polarizers) is used in the device in accordance with the invention and, as will become apparent, even enhanced to obtain a second (transmissive) setting of the display device.

In the reflective polarizer, the change in polarization is greater as the radiation is incident at a larger angle relative to the normal. Therefore, a further display device in accordance with the invention is characterized in that the display device comprises a radiation source which mainly spreads radiation which is incident on the side of the reflective polarizer facing away from the liquid crystal at an angle relative to the normal to the reflective polarizer. For this purpose, use is made, for example, of a sidelight radiation source.

The reflective polarizer preferably comprises a cholesteric filter and a birefringent layer.

Cholesteric filters comprise an optical layer of a (polymerized) liquid-crystal material having a cholesteric order. This means that the molecules are ordered in accordance with a helical structure with a pitch p. If unpolarized radiation is incident on such a layer, a circularly polarized radiation component having a(n) (anti-clockwise or clockwise) direction of rotation corresponding to the direction of the helix, and a wavelength corresponding to the pitch p of the helix will be reflected, whereas a circularly polarized radiation component having the opposite direction of rotation and a wavelength which is not adapted to the pitch is passed.

The cholesteric filter may have either a broad band, because the cholesterically ordered liquid-crystal material has a variable pitch, or it may have a narrow band. The latter is favorable when use is made of a radiation source having a narrow wavelength range, such as an LED.

In a special embodiment, the birefringent layer is constructed as a ¼λ-plate or a ¾λ-plate, the wavelength being adapted to that of the radiation source (in the case of a broad-band cholesteric filter, for example, the average wavelength of the wavelength range used is selected). By rendering the birefringent layer switchable (that is, the polarization-changing effect can be adjusted over at least a part of the thickness of the layer) a more efficient use of the radiation source in the transmissive state can be achieved. Depending on the ambient light, for example, the elipticity of the light passed and hence the contrast can be adapted. It is also possible to use the adjustability of the birefringent layer to eliminate variations in elipticity or undesirable residual elipticity caused by process variations.

A further embodiment of a display device in accordance with the invention is characterized in that, on the side of the second polarizer, the reflective polarizer is provided with a polarization-preserving diffusor layer.

The reflection polarizer is sometimes reflecting (specularly reflecting), which is annoying to the viewer. This reflecting effect is precluded by providing a diffusor which (as a result of its polarization-preserving character) preserves the above-described effect.

The same result can be achieved by means of a diffusor layer which is situated on the side of the first polarizer facing away from the liquid crystal. This diffusor layer does not have to preserve the polarization.

In a preferred embodiment, the diffusor layer serves as the birefringent layer.

Preferably, the directions of polarization of the reflective polarizer and the second polarizer cross each other substantially at right angles. This results in an optimum reflection of ambient light.

The reflective polarizer may further comprise at least one further retardation layer. Dependent upon the choice of the refractive indices of the retardation layers, the angular distribution of reflected light can be influenced or the polarization-changing effect increased, or other advantages can be achieved. A further display device for directed reflection (at a specific angle), which is predominantly used in portable (hand-held) applications, such as telephones, is characterized in that the optical axis of the reflective polarizer is at least locally tilted relative to the plane of the second polarizer.

A reflective polarizer according to the invention is characterized in that the reflective polarizer is provided at said first surface with a polarization-preserving diffusor layer and the reflective polarizer on a second surface facing away from the first surface has a polarization changing effect to light incident at an angle relative to the normal to the second surface.

BRIEF DESCRIPTION OF THE DRAWINGS

These and other aspects of the invention will be apparent from and elucidated with reference to the embodiments described hereinafter.

In the drawings.

The Figures are schematic and not drawn to scale; like reference numerals generally refer to like parts.

DESCRIPTION OF THE PREFERRED EMBODIMENTS

Figure 1:
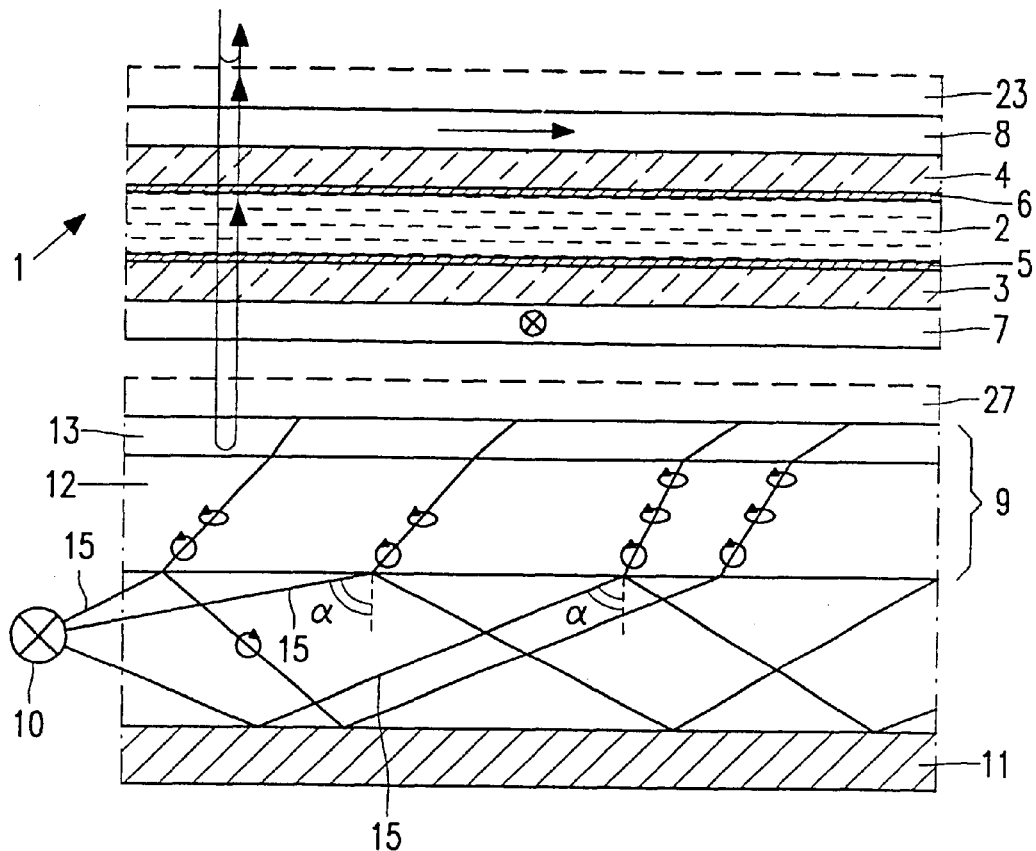
FIG. 1 is a cross-sectional view of a part of a display device in accordance with the invention.

FIG. 1 is a schematic, cross-sectional view of a part of a liquid-crystal display device incorporating a liquid-crystal display cell 1 comprising, in this example, a twisted nematic liquid-crystal material 2 which is sandwiched between two substrates 3, 4 which are made, for example, of glass. The device further comprises two polarizers 7, 8 having mutually perpendicular directions of polarization. The device also comprises transparent drive electrodes 5, 6, for example, of indium tin oxide (ITO) and orientation layers (not shown) which orient the liquid-crystal material at the inner walls of the substrates, in this example, in the direction of the polarization axes of the polarizers, so that the cell has a twist angle of 90 degrees. In this case, the liquid-crystal material has a positive optical anisotropy and a positive dielectric anisotropy. Consequently, if the electrodes 5, 6 are energized, the molecules and hence the directors are directed towards the field.

In this example, the display device further comprises a laterally illuminating lamp 10 which, in combination with a reflecting wall 11, forms a radiation source. A reflective polarizer 9 which, in this example, is composed of a cholesteric filter or a cholesteric polarizer 12 and a ¼λ-plate 13, is arranged between the radiation source and the display cell.

In the driven state, the liquid behaves practically isotropically, that is, the polarization of an incident beam is not adversely affected. Thus, light polarized by the polarizer 8 is absorbed, not passed by the polarizer 7 whose direction of polarization is perpendicular to that of polarizer 8. In the non-driven state, incident light 14 is polarized in the direction of polarization by the polarizer 8. The direction of polarization is rotated through 90 degrees in such a way that the polarizer 7 allows passage of the light. Subsequently, the linearly polarized light is incident on the reflective polarizer 9, which is embodied so as to reflect all the polarized light passed by the polarizer 7. Since the light keeps its direction of polarization, it is passed again by the polarizer 7 and, after its direction of polarization has undergone a rotation in the liquid-crystal material, by the polarizer 8. In the manner described hereinabove, the display device utilizes only ambient light and behaves like a reflective device.

Total reflection by the reflective polarizer 9 having a direction of polarization which is parallel to that of polarizer 8 is achieved, in FIG. 1, in that the ¼λ-plate 13 (or ¾λ-plate) converts the linearly polarized light originating from the polarizer 7 into circularly polarized light with a direction of rotation which corresponds to that of the helix of the cholesteric filter, in this example clockwise.

Polarized light having such a direction of rotation is reflected by the cholesteric filter.

A light beam 15 originating from the lamp 10 comprises left-hand and right-hand polarized light. Left-hand polarized light is passed by the cholesteric filter 12 and converted by the ¼λ-plate 13 into linearly polarized light having a direction of polarization parallel to that of polarizer 8, which, as a result, is not passed by the polarizer 7.

If the left-hand polarized light is incident at an angle relative to the normal to the reflective polarizer, refraction occurs at the surface of the cholesteric filter 12, so that the light passed is no longer purely left-hand. Dependent upon, inter alia, the angle of incidence, the polarization state of the left-hand polarized light is changed as it passes through the cholesteric filter.

This can be accounted for by the optical properties of the cholesteric filter, which is macroscopically described by means of refractive indices $n_x$, $n_y$, $n_z$, ($n_z$: refractive index normal on a surface of the cholesteric filter; $n_x=n_y$: refractive indices in mutually perpendicular directions in a plane at right angles to the direction of $n_z$).

Figure 2:
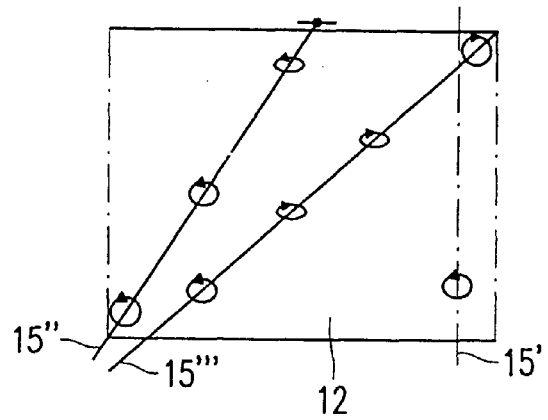
FIG. 2 is a cross-sectional view of a detail of the display device in accordance with the invention.

A perpendicularly incident light beam 15' (FIG. 2) is almost not refracted in the x and y-directions. An obliquely incident light beam 15 (FIGS. 1, 2), however, is initially subject to a greater degree of refraction, for example, in the x-direction than in the y-direction and obtains a more elliptic polarization. In a subsequent part, this effect is enhanced, so that the elipticity increases and the beam can even be polarized linearly (beam 15" in FIG. 2) and even be subjected to a right-hand elliptic (and even circular again) polarization (beam 15'''). The light from a beam 15 is converted by the ¼λ-plate 13 into (partly) polarized light having a direction of polarization parallel to that of polarizer 7, which light is passed by said polarizer 7. After the light has been subjected to a rotation of the polarization direction in the liquid-crystal material, it is passed by the polarizer 8. The behavior of the display device now corresponds to the transmission mode.

By using a property (polarization change upon passing through the cholesteric mirror (reflective polarizer)), which, in the case of a purely transmissive use, leads to a reduction of the contrast, a display device is obtained which can suitably be used in the transmission mode and in the reflection mode. In the case of sufficient ambient light, the lamp 10 is switched off and use is made of the reflective property, and in the case of insufficient ambient light, the lamp 10 is switched on and the transmissive property is predominantly used.

The above-described polarization-changing effect is stronger as the angle α at which the light beams 15 are incident on the side of the reflective polarizer facing away from the liquid crystal is larger relative to the normal (for example>30 degrees). In the present case, this is achieved by employing a sidelight illumination source, however, "backlight" illumination is not excluded.

Figure 3:
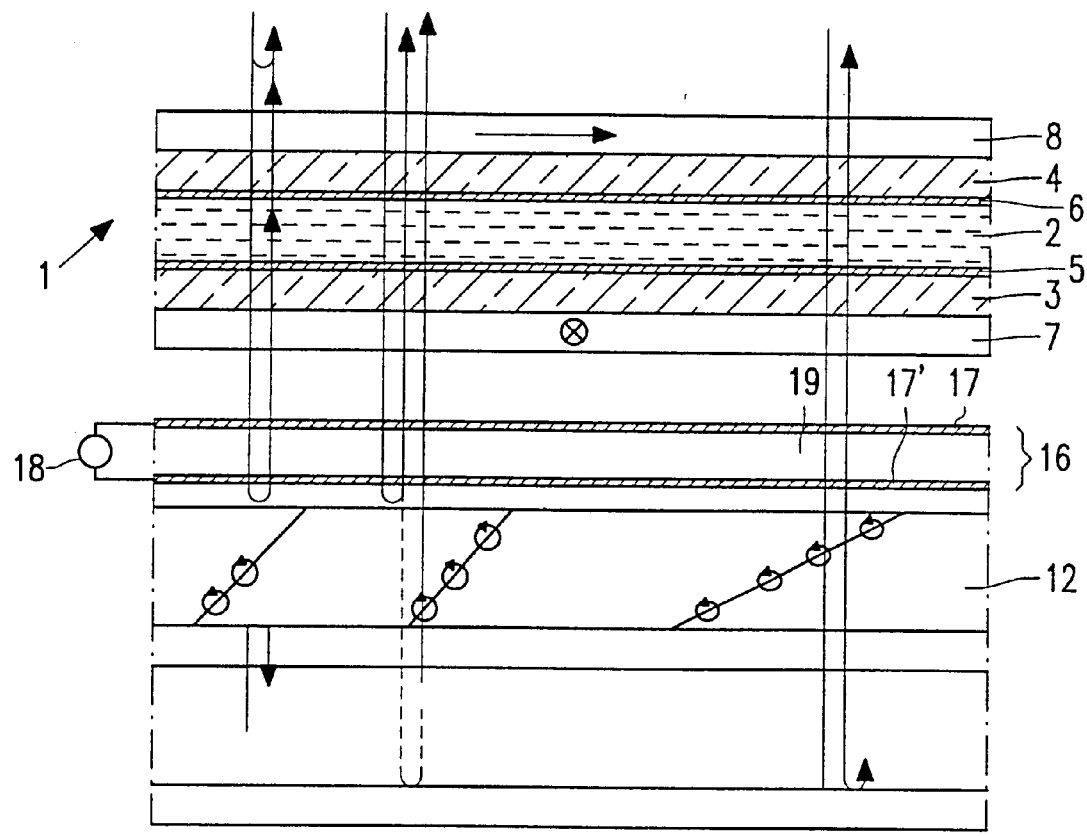
FIG. 3 is a variant of a part of the display device shown in FIG. 1.

The reflective polarizer shown in FIG. 3 comprises a cholesteric mirror 12 combined with a schematically shown birefringent layer 16, the birefringence of which can be selected. For this purpose, the birefringent layer 16 comprises, for example, a layer of a liquid-crystal material 19 across which an adjustable voltage can be applied via a voltage source 18 which is connected to electrodes 17, 17' which set the voltage to be applied across the liquid-crystal material 19. This enables the birefringence across a part of the reflective polarizer to be selected, which can be useful for specific applications (dimming of the backlight in car navigation systems) and for adapting manufacturing tolerances. The birefringent layer 16 can also replace the ¼λ-plate 13 in FIG. 1 or can be added thereto to render the transmission selectable in the transmissive state.

Depending on its construction, the reflective polarizer 9 sometimes has a reflecting surface on the side of the display cell 1, which may be disturbing during operation in the reflection mode. To preclude this, the possibility of providing a diffusor layer 27 in which the polarization is preserved is indicated in FIG. 1 by means of dashed lines. Diffuse light can be obtained by means of an additional structured layer or by structuring the surface of the cholesteric layer 12. In that case, the diffusor layer or the cholesteric mirror cannot be secured directly to the polarizer 7, so that the scattering effect is partly annihilated again. For this reason, the diffusor layer 27 is preferably provided as a (laminated) layer between the reflective polarizer 9 and the polarizer 7. Said diffusor layer 27 is composed, for example, of a transparent film having scattering particles. The polarization is preserved by keeping the number of scattering particles down. In another embodiment, the diffusor layer is situated between the cholesteric mirror 12 and the ¼λ-plate 13 (or the birefringent layer 16).

To avoid said reflecting effect, the display cell may alternatively be provided on the viewing side (i.e. on the side of the polarizer 8 facing away from the liquid crystal) of a diffusor layer 23; said layer does not have to preserve the polarization.

In this example, the pitch of the cholesteric mirror 12 varies across its thickness, the part having the largest pitch facing the lamp side. By virtue thereof, in particular, red light originating from the lamp (for example an LED emitting red light) changes rapidly to light which is circularly polarized in such a manner that it is completely passed by the display cell. As the parts having a smaller pitch are situated on the display-cell side, blue and green light is reflected almost completely. In this manner, the reflective polarizer 9 is optimized to allow passage of light originating from the (in this case) red light source and to reflect other colors (blue, green). This can alternatively be achieved by a cholesteric mirror having a hole in the reflection band, with the pitches of two sub-layers not being contiguous. In that case, the filter has a narrower reflection band (for example in the range from 400 to 600 nm), so that the filter reflects blue and green light on the display-cell side, and almost completely passes red light from the lamp 10 (backlight or sidelight LED). In the case of a different color of the light source, the characteristics of the cholesteric filter are adapted, if necessary.

Figure 4:
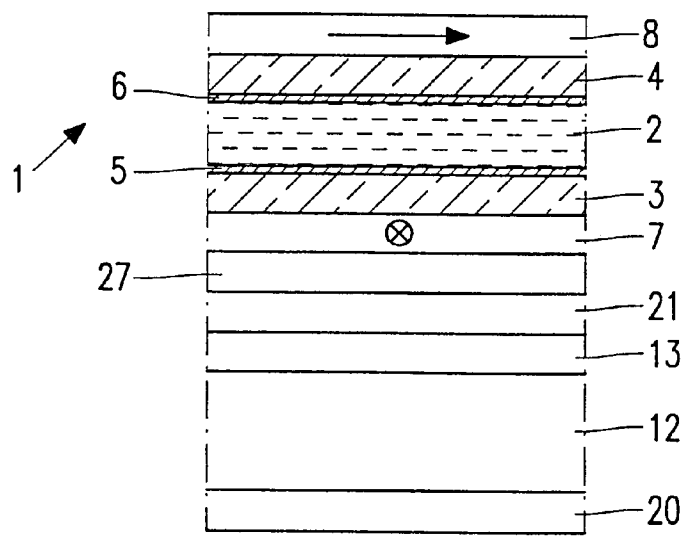
FIG. 4 shows a part of yet another display device in accordance with the invention.

FIG. 4 is a schematic, cross-sectional view of a device in which a second diffusor layer 20 is situated on the lamp side. By virtue thereof, the angular distribution of the light originating from the lamp can be widened further, or the light can be scattered at a preferred angle.

Figure 5:
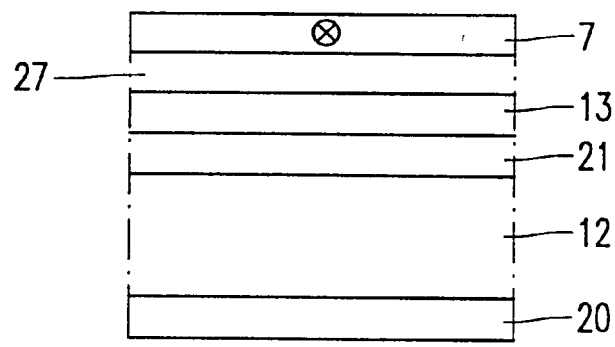
FIG. 5 and FIG. 6 show variants of a part shown in FIG. 4, and FIG. 7 and FIG. 8 show other display devices in accordance with the invention.
Figure 6:
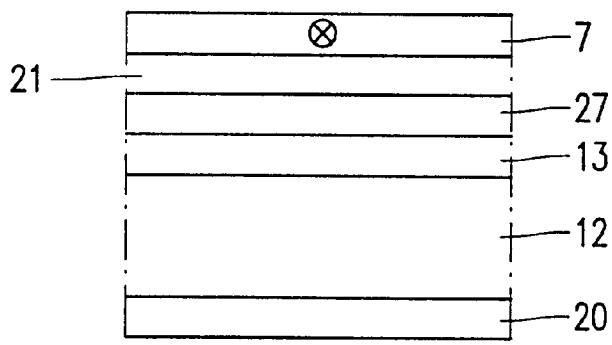

The device shown in FIG. 4 also comprises an additional retardation layer 21 which, if necessary, comprises one or more sub-layers. The position of the layers 13, 27, 21 can be changed, as shown in FIGS. 5 and 6. Depending on the application, the refractive indices $n_x$, $n_y$, $n_z$ of the retardation layer 21 have different relations ($n_z$: refractive index normal on a surface of the retardation layer; $n_x$, $n_y$: refractive indices in mutually perpendicular directions in a plane at right angles to the direction of $n_z$).

a) $n_x=n_y>n_z$ (can be obtained by homeotropically aligning nematic monomers and, subsequently, curing them): such a film compensates for the angular dependence of the cholesteric material, so that the visibility is improved in a larger viewing angle region; in addition, a darker background is obtained during operation in transmission.

b) $n_x=n_y<n_z$ (for example a biaxially stretched polymer film); such a film increases the effect of a change in polarization as described hereinabove, causing the brightness to be increased in transmission.

c) $n_x > n_y = n_z$: such a film provides additional retardation (in a positive or negative sense) and may even serve as the retardation foil 13.

Figure 7:
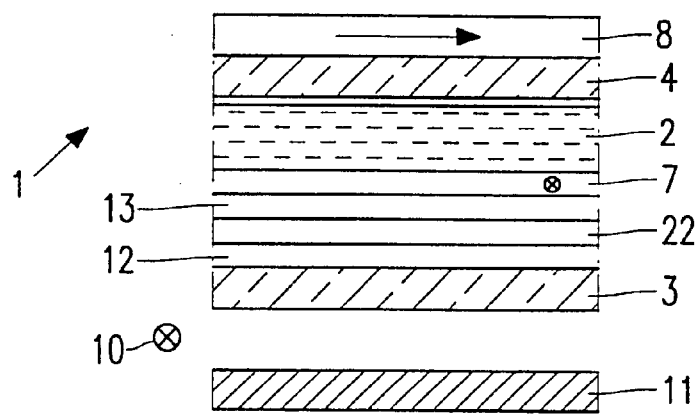

FIG. 7 shows a variant in which the polarizer 3 is situated on the other side of the reflective polarizer. Such an embodiment may be thinner and exhibit less parallax. In this example, the substrate 3 is slightly roughened, for example by manufacturing it so as to be a replica of a sand-blasted glass plate. As a result, the cholesteric layer 12 obtains a disturbed planar structure. To obtain a flat surface, said layer is covered with an additional layer 22 (top coat). This is provided with the quarter-lambda layer 13 and subsequently with a thin polarizer 7.

Figure 8:
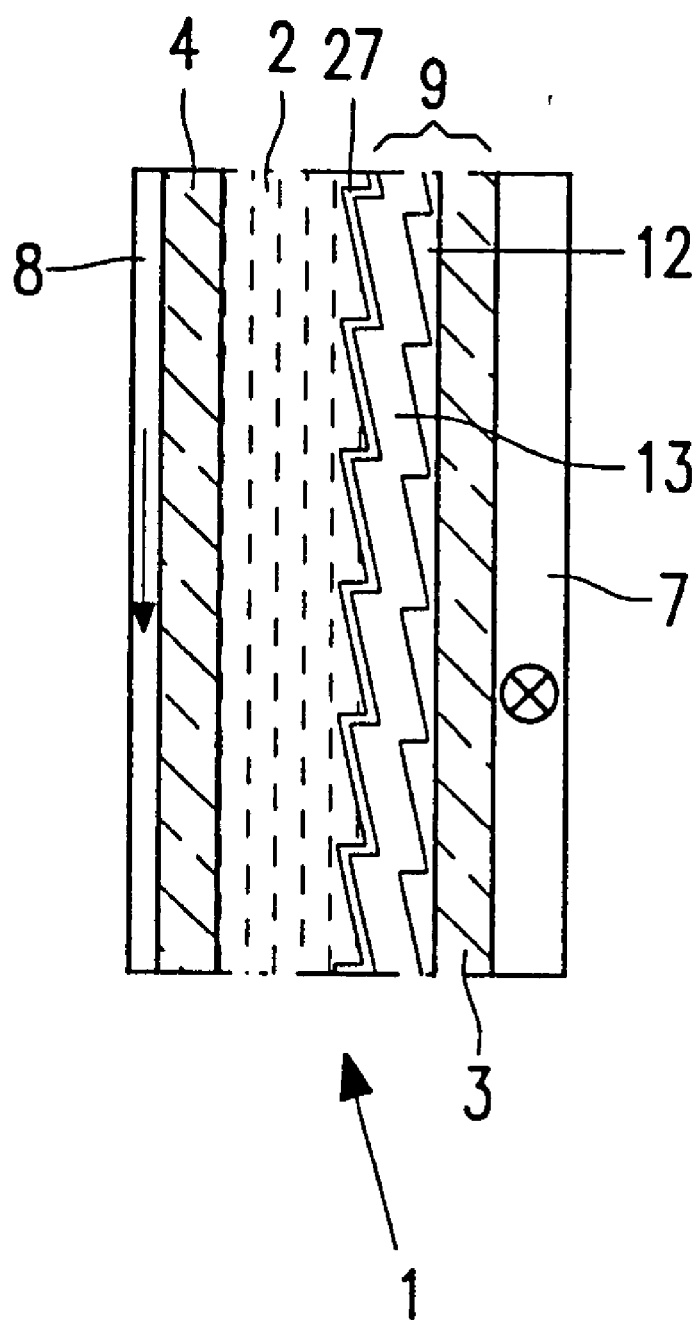

In the device shown in FIG. 8, the combination of a reflective polarizer and a diffusor 27 has a saw-tooth profile, so that light is passed and reflected predominantly at an angle relative to the normal (the optical axis of the reflective polarizer is tilted relative to the normal to the plane of the polarizer). Such a device can very suitably be used, for example, for hand-held applications (mobile telephone, calculators, dashboards, etc.) where the viewer watches the image from an angle.

In summary, the invention relates to a transflective liquid-crystal display device comprising a display cell and a reflective polarizer, which preferably incorporates a cholesteric mirror which practically completely reflects incident radiation (light) of a specific polarization (left-hand or right-hand) originating from the display cell (reflective effect) and which passes a substantial degree of radiation of the same polarization originating from (a light source on) the other side (transmissive effect).

What is claimed is:

1. A liquid-crystal display device provided with a display cell comprising a layer of a liquid-crystal material sandwiched between a first polarizer having a first direction of polarization and a second polarizer having a second direction of polarization, characterized in that said display cell is provided with a reflective polarizer of which the direction of polarization on the side of the second polarizer makes an angle relative to the second direction of polarization and which has on the side facing away from the second polarizer a polarization-changing effect for light incident at an angle relative to the normal to the reflective polarizer.

2. A liquid-crystal display device as claimed in claim 1, characterized in that the reflective polarizer comprises a cholesteric filter and a birefringent layer.

3. A liquid-crystal display device as claimed in claim 2, characterized in that the birefringence of the birefringent layer is adjustable over a part of the thickness of the layer.

4. A liquid-crystal display device as claimed in claim 2, characterized in that, on the side of the second polarizer, the reflective polarizer is provided with a polarization-preserving diffusor layer.

5. A liquid-crystal display device as claimed in claim 4, characterized in that the diffusor layer serves as the birefringent layer.

6. A liquid-crystal display device as claimed in claim 2, characterized in that the cholesteric filter has a variable pitch.

7. A liquid-crystal display device as claimed in claim 1, characterized in that the display device comprises a radiation source which mainly spreads radiation which is incident on the side of the reflective polarizer facing away from the liquid crystal at an angle relative to the normal to the reflective polarizer.

8. A liquid-crystal display device as claimed in claim 1, characterized in that the directions of polarization of the reflective polarizer and the second polarizer cross each other substantially at right angles.

9. A liquid-crystal display device as claimed in claim 1, characterized in that, on the side of the second polarizer, the reflective polarizer is provided with a polarization-preserving diffusor layer.

10. A liquid-crystal display device as claimed in claim 1, characterized in that the display device comprises a diffusor layer which is situated on the side of the first polarizer facing away from the liquid crystal.

11. A reflective polarizer having a polarization direction at a first surface characterized in that the reflective polarizer is provided at said first surface with a polarization-preserving diffusor layer and the reflective polarizer on a second surface facing away from the first surface has a polarization changing effect to light incident at an angle relative to the normal to the second surface.

12. A reflective polarizer as claimed in claim 11, characterized in that the reflective polarizer comprises a cholesteric filter and a birefringent layer.

13. A reflective polarizer as claimed in claim 12, characterized in that the polarization-preserving diffuser layer serves as a birefringent layer.

14. A reflective polarizer as claimed in claim 11, characterized in that the polarization-preserving layer is provided with a further polarization layer.

15. A liquid-crystal display device provided with a display cell comprising a layer of a liquid-crystal material sandwiched between a first polarizer having a first direction of polarization and a second polarizer having, a second direction of polarization, characterized in that said display cell is provided with a reflective polarizer the direction of polarization of which, on the side of the second polarizer makes an angle relative to the second direction of polarization, which reflective polarizer has, on the side facing away from the second polarizer, a polarization-changing effect for light incident at an angle relative to the normal to it and which reflective polarizer has an optical axis that is at least locally tilted relative to the normal to the plane of the second polarizer.

16. A reflective polarizer having a polarization direction at a first surface characterized in that the reflective polarizer is provided at said first surface with a polarization-preserving diffuser layer, the reflective polarizer, on a second surface facing away from the first surface, has a polarization changing effect to light incident at an angle relative to the normal to the second surface and the reflective polarizer is at least locally tilted with respect to the normal to the second surface.

* * * * *